United States Patent
Muhammad

[11] Patent Number: 5,537,774
[45] Date of Patent: Jul. 23, 1996

[54] STEALTH HOOK

[76] Inventor: Nuridin Muhammad, 1683 Madison Ave., Baton Rouge, La. 70802

[21] Appl. No.: 299,052

[22] Filed: Oct. 12, 1994

[51] Int. Cl.$^6$ .................................................. A01K 85/00
[52] U.S. Cl. .................. 43/42.2; 43/43.16; 43/44.83
[58] Field of Search ................ 43/43.16, 44.83, 43/42.19, 42.2, 42.37, 42.11

[56] References Cited

U.S. PATENT DOCUMENTS

| | | | |
|---|---|---|---|
| 456,931 | 8/1891 | Angell | 43/42.37 |
| 570,632 | 11/1896 | Hastings | 43/42.2 |
| 1,002,785 | 9/1911 | Telford | 43/42.2 |
| 1,116,025 | 11/1914 | Cripe | 43/42.2 |
| 1,513,400 | 10/1924 | Koski | 43/43.16 |
| 1,573,288 | 2/1926 | Wilson | 43/42.2 |
| 1,975,218 | 10/1934 | Worden | 43/42.37 |
| 2,154,756 | 4/1939 | Kvitsky | 43/42.37 |
| 2,763,089 | 9/1956 | McDonald | 43/44.83 |
| 2,843,964 | 7/1958 | Smith | 43/44.83 |
| 2,865,131 | 12/1958 | Ellis | 43/43.16 |
| 2,948,983 | 8/1960 | Locklear | 43/42.37 |
| 3,091,885 | 6/1963 | Ulsh | 43/44.83 |
| 3,564,749 | 2/1971 | Fujii | 43/43.16 |
| 3,964,202 | 6/1976 | Ruppa | 43/43.2 |
| 4,028,838 | 6/1977 | Flower | 43/43.16 |
| 4,987,696 | 1/1991 | Cook | 43/43.16 |

FOREIGN PATENT DOCUMENTS

| | | | |
|---|---|---|---|
| 611651 | 1/1961 | Canada | 43/44.83 |
| 2481066 | 10/1981 | France | 43/43.16 |
| 923 | of 1857 | United Kingdom | 43/44.83 |
| 184593 | 8/1922 | United Kingdom | 43/44.83 |

OTHER PUBLICATIONS

Author: Roland Martin; Title: Helicopter Lure; Pertinent pp. 1–22; The Helicopter Lure™, 23–25 Walker Avenue, Baltimore, Md. 21208.

*Primary Examiner*—Kurt Rowan
*Attorney, Agent, or Firm*—David L. Ray

[57] ABSTRACT

A fishing lure assembly including a hook, swivel and fin for attracting and hooking fish and preventing line from twisting when retrieving or casting or when fish is hooked. A blade or fin on the hook causes the hook to turn inside the swivel as the hook is pulled through water or dropped into water. The hook rotates continuously 360° degrees in one direction when it is pulled through the water, and continuously in the opposite when falling or being dropped into water.

17 Claims, 1 Drawing Sheet

STEALTH HOOK

BACKGROUND OF THE INVENTION

1. Field of the Invention

The invention relates to fishing hooks.

2. Description of the Related Art

Fishing hooks having a separate swivel connected to the hook, line and sinker are known in the art.

SUMMARY OF THE INVENTION

In accordance with the present invention there is provided a one piece fishing hook and swivel, the fishing hook having a fin connected thereto which causes the fishing hook to rotate or spin when connected to a fishing line and pulled through water or dropped into water. The swivel prevents the fishing line from twisting as the hook of the invention rotates through the water.

The present invention has the advantage of eliminating the separate swivel that is commonly used with a conventional hook, line, and sinker to prevent twisting of the fishing line.

The present invention has the additional advantage of having the blades which cause the hook to spin attached directly to the hook, thereby eliminating the need for separate propellers.

DESCRIPTION OF THE PREFERRED EMBODIMENTS

Figure 1:
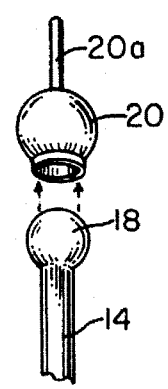
FIG. 1 is a front elevational view, partly cut-away, of the top of the hook of the invention aligned with a swivel.
Figure 2:
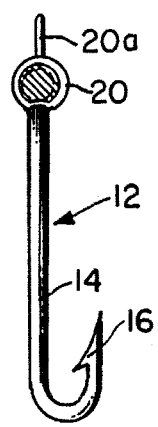
FIG. 2 is a side, elevational view of the hook of the invention of one side of the hook of the invention before blades are added thereto.
Figure 3:
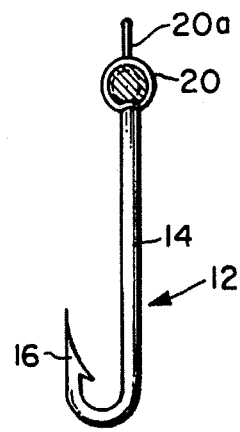
FIG. 3 is a side, elevational view of the hook of the invention of the opposite of the hook of the invention shown in FIG. 2.
Figure 4:
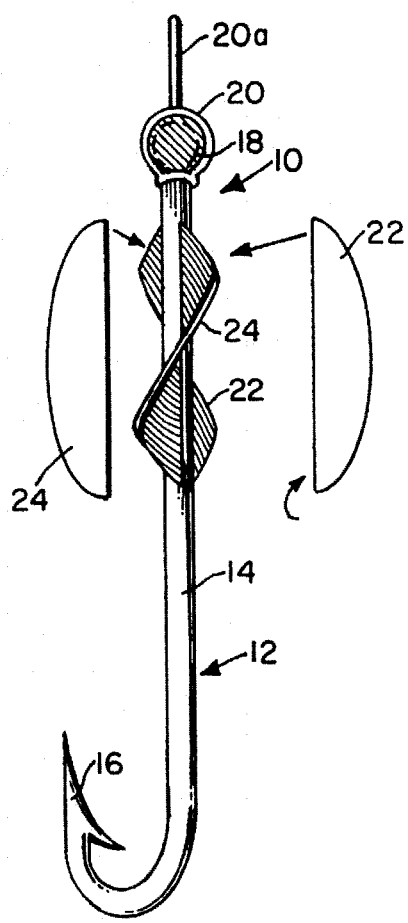
FIG. 4 is a side, elevational view of the hook of the invention having blades attached thereto.
Figure 5:
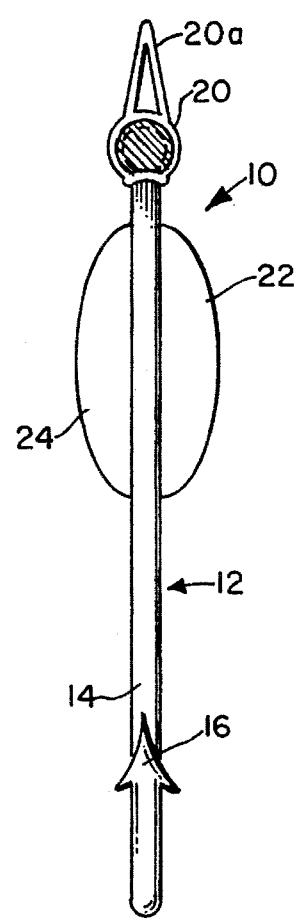
FIG. 5 is a side, elevational view of the hook of the invention shown in FIG. 4 rotated 90°.
Figure 6:
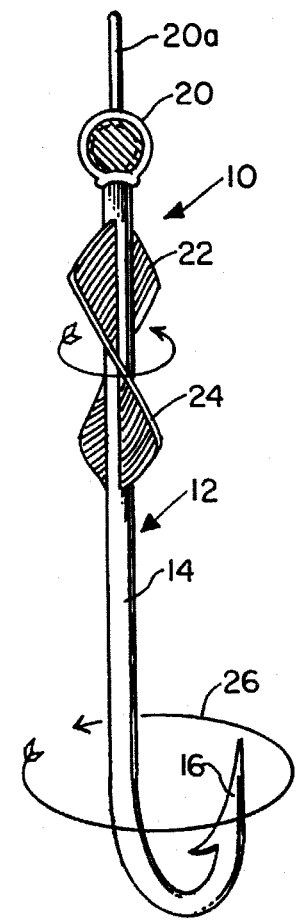
FIG. 6 is a side, elevational view of the hook of FIG. 5 rotated 90°.

Referring now to the drawings, the hook assembly of the invention is generally indicated by the numeral 10 in FIGS. 4, 5 and 6. Hook assembly 10 includes a hook generally indicated by the numeral 12 having a shank 14, a point 16, a spherical ball 18, and a spherical bell or cover 20. Ball 18 is rotatably received in bell 20.

A loop 20a is connected to the top of bell 20. The loop 20a at the top of bell 20 as shown in FIG. 5 is positioned for one end of a fishing line to be tied. The fishing line can be connected to a conventional fishing reel or fishing pole, or may be held by hand.

Ball 18 is positioned inside of bell 20 with enough space between the inside of bell 20 and the outside of ball 20 to permit ball 20 to freely rotate therein so hook 12 can spin freely.

Hook 12 has blades or fins 22 and 24 connected thereto which causes hook 12 to rotate as indicated by arrow 26 in FIG. 6. Blades or fins 22 and 24 can be fixed or detachable; they can be any color or shape to attach the type fish desired.

The distance between ball 28 at the top of hook 12 and blades 22 and 24 should not be less than ¾" inch from the bottom of ball 18 to enable ball 18 to freely rotate inside of bell 20 without restriction.

Fins or blades 22 and 24 can be any length depending on the length of hook used. Blades or fins 22 and 24 are positioned as shown in FIG. 4–6 with enough distance, minimum ¾" from bottom of ball 18 to top of blades or fins 22 and 24. The length or distance from the bottom of blades or fins 22 and 24 to the bottom of hook 12 can be any length or distance depending on the length of hook used to facilitate the size and type of fish being sought or fished for.

Fins or blades 22 and 24 can be used with single, double or triple prong hooks. Fins or blades 22 and 24 are bent or twisted at top and bottom at a 30° degree angle in opposite directions more or less depending on rotation speed desired.

Ball 18, hook 12, and bell 20 are made from non-corrosive metals such as stainless steel or chrome plating or other non-corrosive metals for hooks, and brass or other non-corrosive metals for bell 20.

The present invention rotates while being pulled through the water and gives the appearance of small fish trying to escape. When the hook falls to the bottom, it gives the appearance of diving small fish, or minnows. No organic bait such as worms or insects is necessary. However, bait can be used such as plastic or real (organic) bait. Also, any artificial bait that can be used on a conventional hook can be used on the hook of the invention.

Although the preferred embodiments of the invention have been described in detail above, it should be understood that the invention is in no sense limited thereby, and its scope is to be determined by that of the following claims:

What is claimed is:

1. A fishing lure assembly comprising:
   a. a fish hook having a shank, a spherical ball at the end of the shank, and a point,
   b. swivel means rotatably connected to said ball for connecting said fish hook to a fishing line, said swivel means including bell means for rotatable receipt of said ball means, and
   c. fin means rigidly connected to said fish hook for causing said fish hook to rotate when said fish hook is moving through water, said fin means including an elongated blade connected to said shank of said hook, said blade forming a spiral on said shank of said hook.

2. The fishing lure assembly of claim 1 wherein said blade is generally semi-circular in shape.

3. The fishing lure assembly of claim 1 wherein said fin means includes two elongated blades connected to said shank of said hook.

4. The fishing lure assembly of claim 1 wherein each of said blades form a spiral on said shank of said hook.

5. The fishing lure assembly of claim 4 wherein said blade is generally semi-circular in shape.

6. The fishing lure assembly of claim 1 wherein said swivel means has loop means connected thereto for receipt of one end of a fishing line.

7. The fishing lure assembly of claim 6 wherein said swivel means comprises a rigid, generally spherical hollow housing open at the bottom for rotatable receipt of said ball.

8. The fishing lure assembly of claim 7 wherein said hollow housing has loop means connected thereto for receipt of one end of a fishing line.

9. The fishing lure assembly of claim 12 wherein said fin means includes an elongated blade connected to said shank of said hook.

10. The fishing lure assembly of claim 9 wherein said blade forms a spiral on said shank of said hook.

11. The fishing lure assembly of claim 10 wherein said blade is generally semi-circular in shape.

12. The fishing lure assembly of claim 9 wherein said fin means includes two elongated blades connected to said shank of said hook.

13. The fishing lure assembly of claim 12 wherein each of said blades form a spiral on said shank of said hook.

14. The fishing lure assembly of claim 13 wherein said blade is generally semi-circular in shape.

15. A fishing lure assembly comprising:

a. a fish hook having a shank, a spherical ball at the end of the shank, and a point, b. swivel means rotatably connected to said ball for connecting said fish hook to a fishing line, said swivel means having loop means connected thereto for receipt of one end of a fishing line, said swivel means including a rigid, generally spherical hollow housing open at the bottom for rotatable receipt of said ball, and c. fin means rigidly connected to said fish hook for causing said fish hook to rotate when said fish hook is moving through water, said fin means including an elongated blade connected to said shank of said hook, said blade forming a spiral on said shank of said hook.

16. The fishing lure assembly of claim 15 wherein said blade is generally semi-circular in shape.

17. The fishing lure assembly of claim 16 wherein said fin means includes two elongated blades connected to said shank of said hook.

* * * * *